United States Patent
Chen et al.

(10) Patent No.: US 8,752,992 B2
(45) Date of Patent: Jun. 17, 2014

(54) BACKLIGHT MODULE

(75) Inventors: ShihHsiang Chen, Shenzhen (CN); ChengWen Que, Shenzhen (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 211 days.

(21) Appl. No.: 13/512,874

(22) PCT Filed: Apr. 13, 2012

(86) PCT No.: PCT/CN2012/073963
§ 371 (c)(1),
(2), (4) Date: May 30, 2012

(87) PCT Pub. No.: WO2013/143180
PCT Pub. Date: Oct. 3, 2013

(65) Prior Publication Data
US 2013/0250608 A1    Sep. 26, 2013

(51) Int. Cl.
F21V 17/02 (2006.01)
F21V 13/12 (2006.01)
F21V 8/00 (2006.01)
F21V 17/16 (2006.01)
F21V 13/14 (2006.01)

(52) U.S. Cl.
CPC ............... *F21V 17/164* (2013.01); *F21V 13/12* (2013.01); *F21V 13/14* (2013.01); *G02B 6/0088* (2013.01)
USPC ............................ 362/608; 362/618; 362/634

(58) Field of Classification Search
CPC ....... F21V 13/12; F21V 13/14; F21V 17/164; G02B 6/0088
USPC .................................. 362/608, 618, 633, 634
See application file for complete search history.

(56) References Cited

U.S. PATENT DOCUMENTS

2009/0219724 A1* 9/2009 Wang et al. .................... 362/362

FOREIGN PATENT DOCUMENTS

CN 1372160 A 10/2002
CN 1595259 A 3/2005

* cited by examiner

*Primary Examiner* — David V Bruce
(74) *Attorney, Agent, or Firm* — Cheng-Ju Chiang

(57) ABSTRACT

The present invention provides a backlight module, which includes a backplane, a light guide board arranged inside the backplane, and a plurality of elastic bodies arranged between the backplane and the light guide board. The backplane includes a bottom plate and a plurality of side plates perpendicularly mounted to a perimeter of the bottom plate. The light guide board includes a bottom surface facing the bottom plate, a top surface distant from the bottom plate, and a plurality of side surfaces connecting between the bottom surface and the top surface. The elastic bodies are respectively mounted to three of the side plates of the backplane and are set abutting against three of the side surfaces of the light guide board. The elastic bodies form contact surfaces that engage the side surfaces of the light guide board and are curved surfaces or spherical surfaces.

12 Claims, 2 Drawing Sheets

BACKLIGHT MODULE

BACKGROUND OF THE INVENTION

1. Field of the Invention

The present invention relates to a backlight module, and in particular to a backlight module that comprises elastic bodies to retain a light guide board.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules interposed between two parallel glass plates and a plurality of vertical and horizontal fine electrical wires is arranged between the two glass plates, whereby the liquid crystal molecules are controlled to change direction by application of electricity to refract light emitting from the backlight module for generating images. Since the liquid crystal display panel itself does not emit light, light must be provided by the backlight module in order to generate images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal display panel to form a planar light source to directly provide lighting to the liquid crystal display panel. The side-edge backlight module arranged an LED light bar of light source at an edge of a back panel that is located rearward of one side of the liquid crystal display panel. The LED light bar emits light that enters a light guide plate through a light incident face of the light guide plate and is projected out through a light exit face after being reflected and diffused to thereby form a planar light source to be provided to the liquid crystal display panel.

In the manufacture process of backlight module, positioning and retaining a light guide board is very important. The conventional way of positioning and retaining a light guide board is to provide rivet pegs on a backplane or to make bending to form retention pawl structures and to form corresponding slots or projections on the light guide board in order to effect to engagement and positioning. However, the current trend of LCD is thinning and increasing size. This makes the light guide board increasingly thin and the thermal expansion characteristics of the light guide board due to absorption of heat are getting prominent. This makes it necessary, in mounting a light guide board, to keep a gap between a positioning section of the light guide board and an engagement and mounting structure of the backplane for accommodating expansion and contraction of the light guide so that the light guide board is provided with a predetermined amount of movability in the interior of the backlight module. The movement of the light guide board may easily lead to problems, such as abrasion of the light guide board. Further, since the light guide board comprises slot or projection structures, the manufacture cost is increased and the mechanical strength of the light guide board is reduced, so that breaking may occur on the light guide board when subjected to impacts caused by external forces. Further, since the light guide board is provided in a circumference thereof with slot or projection, the optic path of light might get locally varied at the sides of the light guide board and this may cause certain optic problems, such as non-uniform brightness at edges of the backlight module, making the yield rate of slim bezel backlight module significantly reduced.

SUMMARY OF THE INVENTION

An objective of the present invention is to provide a backlight module, which comprises elastic bodies arranged between side plates of a backplane and a light guide board to securely retain the light guide board in the backplane so as to avoid special processing applied to the light guide board that is conventional taken for fixing the light guide board, simplify the manufacture process, reduce the manufacture cost, and also ensure the uniformity of irradiation and luminance of the entire backlight module and to provide a buffering space to the light guide board to avoid deformation of the light guide board caused by compression thereby improve the overall quality of the backlight module.

To achieve the objective, the present invention provides a backlight module, which comprises: a backplane, a light guide board arranged inside the backplane, and a plurality of elastic bodies arranged between the backplane and the light guide board. The backplane comprises a bottom plate and a plurality of side plates perpendicularly mounted to a perimeter of the bottom plate. The light guide board comprises a bottom surface facing the bottom plate, a top surface distant from the bottom plate, and a plurality of side surfaces connecting between the bottom surface and the top surface. The plurality of elastic bodies is respectively mounted to three of the side plates of the backplane. The plurality of elastic bodies is set abutting against three of the side surfaces of the light guide board. The elastic bodies form contact surfaces that engage the side surfaces of the light guide board and are curved surfaces or spherical surfaces.

The plurality of side surfaces of the light guide board respectively faces the plurality of side plates of the backplane. Said three side plates of the backplane respectively form a plurality of retention channels. The elastic bodies are received and retained in the retention channels and abutting against said three side surfaces of the light guide board.

The elastic bodies are made of silicone rubber.

The retention channels are each of a sideway-opening U-shaped configuration extending from inner side of the corresponding side plate toward an outer side. The elastic bodies are received and retained in the retention channels with the contact surfaces thereof that engage the side surfaces of the light guide board projecting outside the retention channels.

The elastic bodies are spheres or ellipsoids.

The retention channels are through holes and the elastic bodies have an end fit into and retained in the through holes and an opposite end abutting against the side surfaces of the light guide board.

The elastic bodies have an end forming an engagement slot, which has a width corresponding to thickness of the side plates. The retention channels have a circumference received in the engagement slot. The opposite end of the elastic bodies forms a contact surface that is in contact engagement with the side surfaces of the light guide board and is a curved surface or a spherical surface.

The elastic bodies are of a shape of cylinder, sphere, or ellipsoid.

The light guide board is rectangular in shape having four side surfaces and the backplane is rectangular in shape having four side plates.

The backlight module further comprises a backlight source mounted to the side plates of the backplane, a reflector plate mounted to the bottom surface of the light guide board, and an optic film positioned on the top surface of the light guide board.

The efficacy of the present invention is that the present invention provides a backlight module, which comprises elastic bodies arranged between the side plates of the backplane and the light guide board to retain the light guide board inside the backplane without the need of forming slots or projections on a circumference of the light guide board so as to ensure mechanical strength of the light guide board and at the same time provide a buffering space to avoid deformation caused by compression due to thermal expansion found in the conventional light guide board, greatly reduce free movement space of the light guide board, and absorb direct impact that external forces apply to the light guide board to effect protection of the light guide board. Further, the situation of structural deformation of the light guide board that leads to variation of the optic path of light can be avoided to thereby ensure intensity of light irradiation and uniformity of light irradiation so as to improve overall quality of the backlight module and reduce manufacture cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to preferred embodiments of the present invention and the attached drawings.

Figure 1:
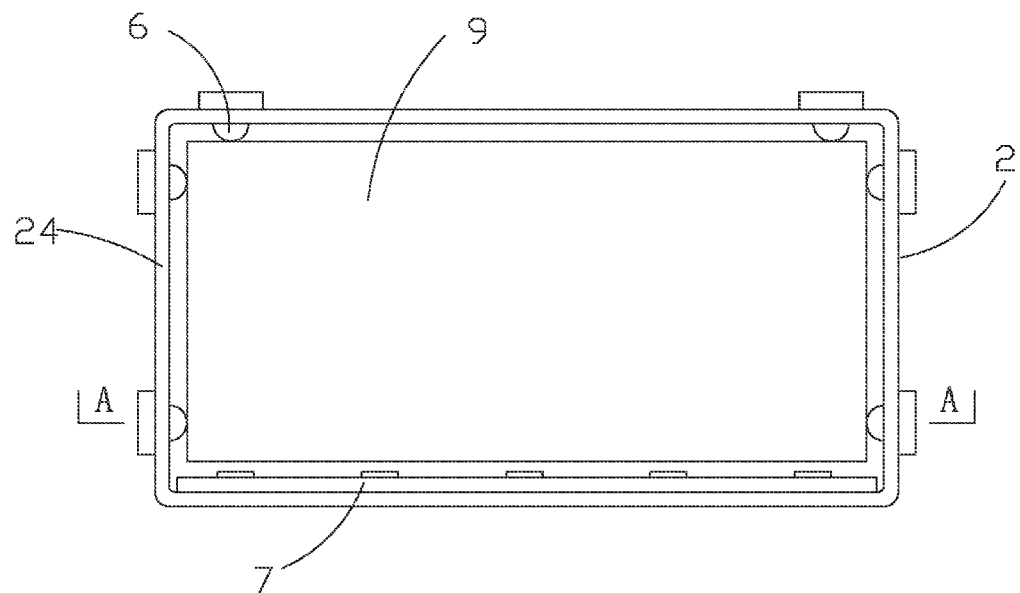
FIG. 1 is a schematic view showing the structure of a backlight module according to an embodiment of the present invention.
Figure 2:
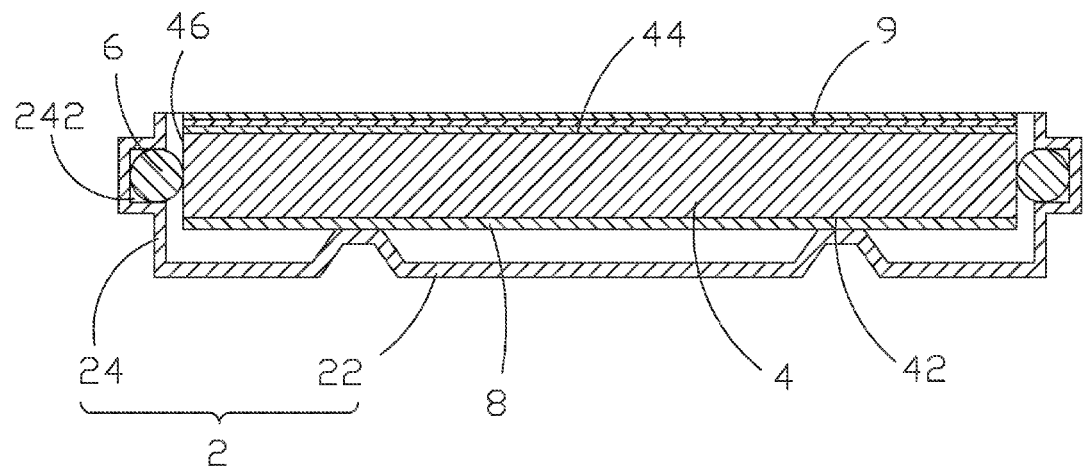
FIG. 2 is a cross-sectional view taken along line A-A of FIG. 1.

Referring to FIGS. 1 and 2, as an embodiment of backlight module according to the present invention, the backlight module comprises a backplane 2, a light guide board 4 arranged inside the backplane 2, and a plurality of elastic bodies 6 arranged between the backplane 2 and the light guide board 4. The backplane 2 comprises a bottom plate 22 and a plurality of side plates 24 perpendicularly mounted to a perimeter of the bottom plate 22. The light guide board 4 comprises a bottom surface 42 facing the bottom plate, a top surface 44 distant from the bottom plate, and a plurality of side surfaces 46 connecting between the bottom surface 42 and the top surface 44. The plurality of side surfaces 46 respectively opposes the plurality of side plates 24 of the backplane 2. Three of the side plates 24 of the backplane 2 are respectively provided with a plurality of retention channels 242, and the elastic bodies 6 are received and retained in the retention channels 242 to be in contact engagement with the corresponding side surfaces 46 of the light guide board 4 so as to fix the light guide board inside the backplane 2. In the instant embodiment, the backplane 2 is rectangular in shape having four side plates 24 and the light guide board 4 is also rectangular in shape having four side surfaces 46.

The elastic bodies 6 are made of an elastic material, such as silicone rubber, having predetermined elasticity and strength. The elastic bodies 6 that are received and retained in the retention channels 242 of the side plates 24 of the backplane 2 and set in contact engagement with the corresponding side surfaces 46 of the light guide board 4 securely retain the light guide board 4 in position, also provides the light guide board 4 with a buffering space that protects the light guide board 4 from undesired deformation caused by compression due to thermal expansion, greatly reduces free movement space of the light guide board 4, and absorbs direct impact that external forces apply to the light guide board 4 to effect protection of the light guide board 4. Further, each elastic body 6 forms a contact surface that is in contact engagement with the light guide board 4 and is a curved surface or a spherical surface, which makes the mounting operation smooth, provides better resilient retention and elastic cushioning effect, and also eliminates the special processing applied to the structure of the light guide board 4 that is adopted conventionally for the purposes of fixing the light guide board 4 so as to reduce manufacturing cost, simplify the manufacturing process, and at the same time avoid modification of the structure of the light guide board 4 that leads to variation of optic path of light, thereby ensuring uniformity of radiation and luminance of the entire backlight module.

Referring to FIG. 2, in the instant embodiment, the retention channel 242 is of a sideways-open U-shaped configuration that extends from inner side of the side plate 24 toward outer side. The elastic body 6 is spherical or ellipsoid. The elastic bodies 6 are respectively received and retained in the retention channels 242 with opposite ends thereof abutting a bottom of the channel 242 and the corresponding side surface 46 of the light guide board 4 and the portion of each elastic body that engages the side surface 46 of the light guide board projects outside the retention channel 242, whereby the light guide board 4 is securely retained inside the backplane 4 by the elastic bodies 6.

The backlight module further comprises a backlight source 7 mounted to the side plates 24 of the backplane 2, a reflector plate 8 mounted to the bottom surface 42 of the light guide board 4, and optic films 9 positioned on the top surface 44 of the light guide board 4. In the instant embodiment, the backlight module is a side-edge backlight module; three of the side plates 24 of the backplane 2 form the retention channels 242 to receive and retain therein the elastic bodies 6 and the backlight source 7 is arranged at one side of the light guide board 4 and mounted to the remaining one of the side plates 24 of the backplane 2. The backlight source 7 comprises a printed circuit board (PCB) and a plurality of light-emitting diodes (LEDs) mounted on the PCB and further comprises a heat dissipation rack, which is arranged between the PCB and the side plate 24 to transfer the heat generated by the LEDs to the backplane 2.

Figure 3:
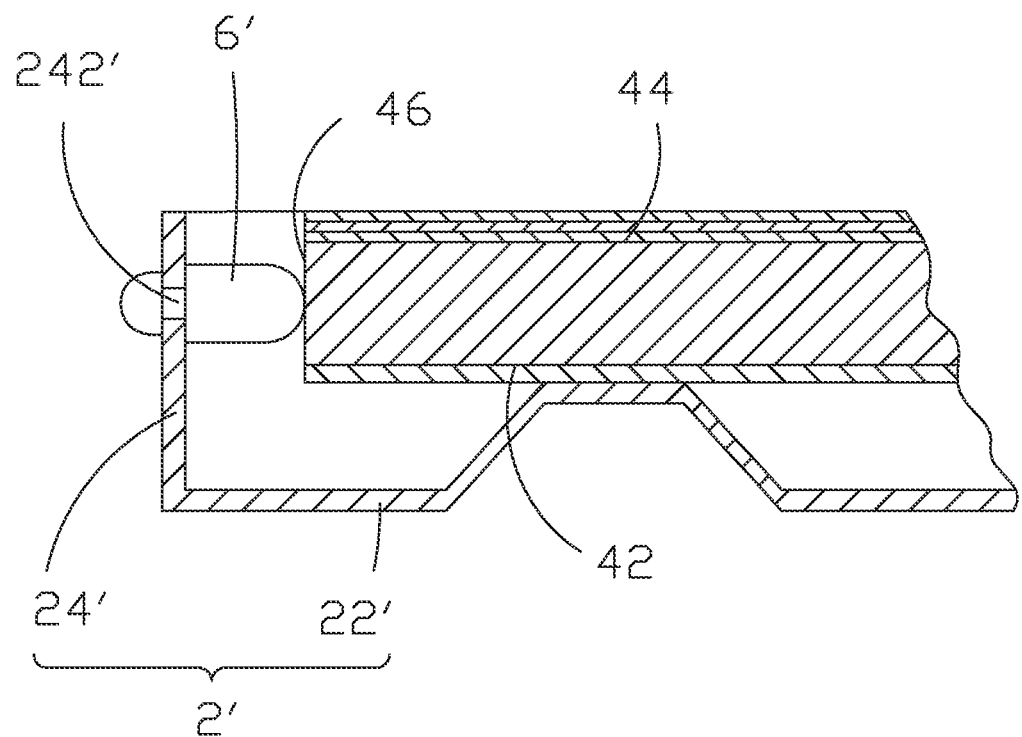
FIG. 3 is a cross-sectional view of a backlight module according to another embodiment of the present invention.
Figure 4:
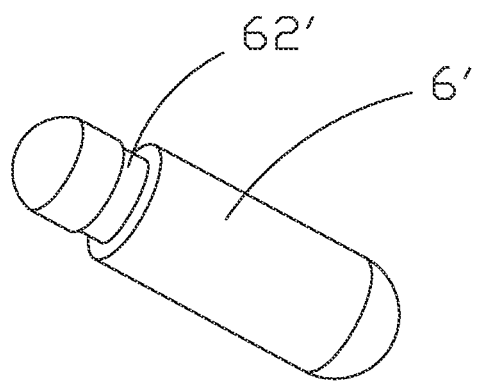
FIG. 4 is a perspective view showing an elastic body of FIG. 3.

Referring to FIGS. 3 and 4, schematic views showing the structure of another embodiment of the present invention are provided. In the instant embodiment, the backlight module comprises a backplane 2', a light guide board 4 arranged inside the backplane 2', and a plurality of elastic bodies 6' arranged inside the backplane 2'.

The backplane 2' comprises a bottom plate 22' and a plurality of side plates 24' perpendicularly mounted to a perimeter of the bottom plate 22'. The light guide board 4 comprises a bottom surface 42 facing the bottom plate, a top surface 44 distant from the bottom plate, and a plurality of side surfaces 46 connecting between the bottom surface 42 and the top surface 44.

Three of the side plates 24' of the backplane 2' are respectively provided with a plurality of retention channels 242', and the retention channels 242' are through holes. Each of the elastic bodies 6' has an end fit into and retained in the respective through hole and an opposite end abutting against the corresponding side surface 46 of the light guide board 4.

The elastic bodies 6' are made of an elastic material, such as silicone rubber, and have a shape of cylinder, sphere, or ellipsoid. In the instant embodiment, the elastic bodies 6' are cylindrical in shape. Each of the elastic bodies 6' has an end forming a circumferential engagement slot 62', which has a width corresponding to thickness of the corresponding side plate 24', whereby a circumference of the retention channel 242' is receivable into the engagement slot 62'. The opposite end of the elastic body 6' forms a contact surface that is set in contact engagement with the corresponding side surface 46 of the light guide board 4. The contact surface is a curved surface or a spherical surface so as to achieve the same effect as the previously discussed embodiment.

In summary, the present invention provides a backlight module, which comprises elastic bodies arranged between the side plates of the backplane and the light guide board to retain the light guide board inside the backplane without the need of forming slots or projections on a circumference of the light guide board so as to ensure mechanical strength of the light guide board and at the same time provide a buffering space to avoid deformation caused by compression due to thermal expansion found in the conventional light guide board, greatly reduce free movement space of the light guide board, and absorb direct impact that external forces apply to the light guide board to effect protection of the light guide board. Further, the situation of structural deformation of the light guide board that leads to variation of the optic path of light can be avoided to thereby ensure intensity of light irradiation and uniformity of light irradiation so as to improve overall quality of the backlight module and reduce manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide board arranged inside the backplane, and a plurality of elastic bodies arranged between the backplane and the light guide board, the backplane comprising a bottom plate and a plurality of side plates perpendicularly mounted to a perimeter of the bottom plate, the light guide board comprising a bottom surface facing the bottom plate, a top surface distant from the bottom plate, and a plurality of side surfaces connecting between the bottom surface and the top surface, the plurality of elastic bodies being respectively mounted to three of the side plates of the backplane, the plurality of elastic bodies being set abutting against three of the side surfaces of the light guide board, the elastic bodies forming contact surfaces that engage the side surfaces of the light guide board and are curved surfaces or spherical surfaces.

2. The backlight module as claimed in claim 1, wherein the plurality of side surfaces of the light guide board respectively face the plurality of side plates of the backplane, said three side plates of the backplane respectively forming a plurality of retention channels, the elastic bodies being received and retained in the retention channels and abutting against said three side surfaces of the light guide board.

3. The backlight module as claimed in claim 1, wherein the elastic bodies are made of silicone rubber.

4. The backlight module as claimed in claim 2, wherein the retention channels are each of a sideway-opening U-shaped configuration extending from inner side of the corresponding side plate toward an outer side, the elastic bodies being received and retained in the retention channels with the contact surfaces thereof that engage the side surfaces of the light guide board projecting outside the retention channels.

5. The backlight module as claimed in claim 4, wherein the elastic bodies are spheres or ellipsoids.

6. The backlight module as claimed in claim 2, wherein the retention channels are through holes and the elastic bodies have an end fit into and retained in the through holes and an opposite end abutting against the side surfaces of the light guide board.

7. The backlight module as claimed in claim 6, wherein the elastic bodies have an end forming an engagement slot, which has a width corresponding to thickness of the side plates, the retention channels having a circumference received in the engagement slot, the opposite end of the elastic bodies forming a contact surface that is in contact engagement with the side surfaces of the light guide board and is a curved surface or a spherical surface.

8. The backlight module as claimed in claim 7, wherein the elastic bodies are of a shape of cylinder, sphere, or ellipsoid.

9. The backlight module as claimed in claim 1, wherein the light guide board is rectangular in shape having four side surfaces and the backplane is rectangular in shape having four side plates.

10. The backlight module as claimed in claim 1, wherein the backlight module further comprises a backlight source mounted to the side plates of the backplane, a reflector plate mounted to the bottom surface of the light guide board, and an optic film positioned on the top surface of the light guide board.

11. A backlight module, comprising: a backplane, a light guide board arranged inside the backplane, and a plurality of elastic bodies arranged between the backplane and the light guide board, the backplane comprising a bottom plate and a plurality of side plates perpendicularly mounted to a perimeter of the bottom plate, the light guide board comprising a bottom surface facing the bottom plate, a top surface distant from the bottom plate, and a plurality of side surfaces connecting between the bottom surface and the top surface, the plurality of elastic bodies being respectively mounted to three of the side plates of the backplane, the plurality of elastic bodies being set abutting against three of the side surfaces of the light guide board, the elastic bodies forming contact surfaces that engage the side surfaces of the light guide board and are curved surfaces or spherical surfaces;

the plurality of side surfaces of the light guide board respectively facing the plurality of side plates of the backplane, said three side plates of the backplane respectively forming a plurality of retention channels, the elastic bodies being received and retained in the retention channels and abutting against said three side surfaces of the light guide board;

the elastic bodies being made of silicone rubber;

the retention channels being each of a sideway-opening U-shaped configuration extending from inner side of the corresponding side plate toward an outer side, the elastic bodies being received and retained in the retention channels with the contact surfaces thereof that engage the side surfaces of the light guide board projecting outside the retention channels;

the elastic bodies are spheres or ellipsoids; and the backlight module further comprising a backlight source mounted to the side plates of the backplane, a reflector plate mounted to the bottom surface of the light guide board, and an optic film positioned on the top surface of the light guide board.

12. A backlight module, comprising: a backplane, a light guide board arranged inside the backplane, and a plurality of elastic bodies arranged between the backplane and the light guide board, the backplane comprising a bottom plate and a plurality of side plates perpendicularly mounted to a perimeter of the bottom plate, the light guide board comprising a bottom surface facing the bottom plate, a top surface distant from the bottom plate, and a plurality of side surfaces connecting between the bottom surface and the top surface, the plurality of elastic bodies being respectively mounted to three of the side plates of the backplane, the plurality of elastic bodies being set abutting against three of the side surfaces of the light guide board, the elastic bodies forming contact surfaces that engage the side surfaces of the light guide board and are curved surfaces or spherical surfaces;

the plurality of side surfaces of the light guide board respectively facing the plurality of side plates of the backplane, said three side plates of the backplane respectively forming a plurality of retention channels, the elastic bodies being received and retained in the retention channels and abutting against said three side surfaces of the light guide board;

the elastic bodies being made of silicone rubber;

the retention channels being through holes and the elastic bodies having an end fit into and retained in the through holes and an opposite end abutting against the side surfaces of the light guide board;

the elastic bodies having an end forming an engagement slot, which has a width corresponding to thickness of the side plates, the retention channels having a circumference received in the engagement slot, the opposite end of the elastic bodies forming a contact surface that is in contact engagement with the side surfaces of the light guide board and is a curved surface or a spherical surface;

the elastic bodies being of a shape of cylinder, sphere, or ellipsoid; and the backlight module further comprising a backlight source mounted to the side plates of the backplane, a reflector plate mounted to the bottom surface of the light guide board, and an optic film positioned on the top surface of the light guide board.

* * * * *